United States Patent [19]

Mietzner et al.

[11] 4,087,602
[45] May 2, 1978

[54] MULTI-STAGE ISOLATION OF HIGH PRESSURE POLYETHYLENE

[75] Inventors: Franz Georg Mietzner, Ludwigshafen; Oskar Buechner, Dudenhofen; Klaus Steigerwald, Ludwigshafen; Gottfried Schlichthaerle, Neustadt; Friedrich Urban, Limburgerhof, all of Germany

[73] Assignee: BASF Aktiengesellschaft, Ludwigshafen, Germany

[21] Appl. No.: 687,872

[22] Filed: May 19, 1976

[30] Foreign Application Priority Data

May 31, 1975 Germany .............................. 2524203

[51] Int. Cl.² ............................ C08F 6/26; C08F 6/28
[52] U.S. Cl. ................................ 528/481; 260/676 R; 526/64; 526/352; 528/501; 528/503
[58] Field of Search ........................ 528/481, 501, 503; 260/676 R

[56] References Cited

U.S. PATENT DOCUMENTS

| 2,646,425 | 7/1953 | Barry ..................................... 260/94.9 |
| 3,201,365 | 8/1965 | Charlesworth et al. ............ 260/34.2 |
| 3,336,281 | 8/1967 | Eilbracht et al. .................... 260/94.9 |
| 3,412,080 | 11/1968 | Smith et al. ......................... 260/94.9 |

*Primary Examiner*—Stanford M. Levin
*Attorney, Agent, or Firm*—Keil, Thompson & Shurtleff

[57] ABSTRACT

A process for the manufacture of ethylene polymers by homopolymerization and copolymerization of ethylene at pressures of from 500 to 5,000 bars and at from 50° to 450° C, with subsequent isolation of the polymers in high pressure product isolation zones and low pressure product isolation zones. The various parallel product isolation zones are at different temperatures, and the mean product residence times in the zones may be identical or different. Very different products, in amounts which can be chosen according to requirements, and with mutually independent polymer properties, can be obtained using only one high pressure polymerization system.

4 Claims, 1 Drawing Figure

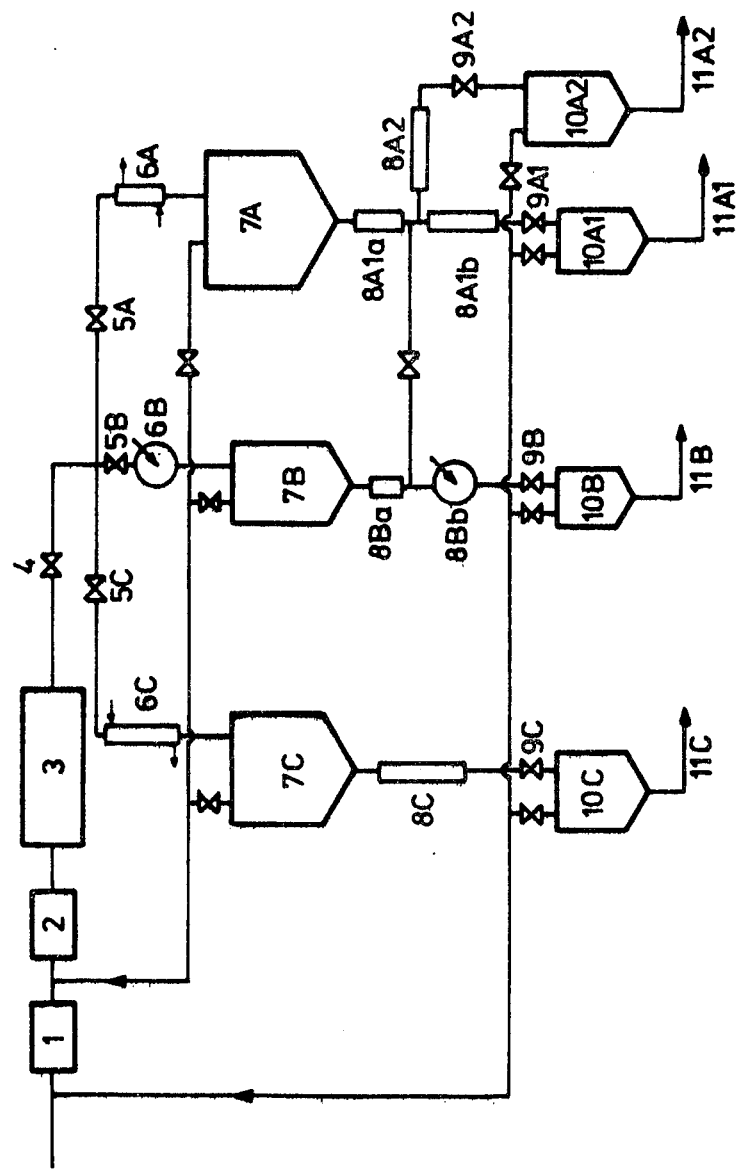

MULTI-STAGE ISOLATION OF HIGH PRESSURE POLYETHYLENE

The present invention relates to a process for the manufacture of ethylene polymers.

The ethylene polymers are manufactured by homopolymerization of ethylene or copolymerization of ethylene with other compounds, which are copolymerizable with ethylene, in a continuous polymerization system at pressures of from 500 to 5,000 bars and at from 50° to 450° C, followed by isolation of the resulting polymers from the reaction mixture obtained, at from 100° to 400° C, with means residence times of from 0.5 to 60 minutes, in parallel high pressure product isolation zones at pressures of from 100 to 500 bars and subsequent low pressure product isolation zones at pressures of from 1 to 10 bars.

Processes for the manufacture of ethylene polymers and copolymers by polymerization of ethylene, in the presence or absence of co-reactants, in tubular reactors or stirred autoclaves, in the presence of initiators and, if desired, chain transfer agents, stabilizers or solubilizers, at pressures above 500 bars and at from 50° to 450° C, have been disclosed. The subsequent isolation of the polymer from the reaction mixture is usually carried out in two steps, in a high pressure product isolation zone which is generally operated at pressures of from 100 to 500 bars, and in a low pressure product isolation zone, which is operated at pressures of a few bars.

German Published Application No. 2,120,624 (British Pat. No. 313,836) discloses a process for the high pressure polymerization of ethylene in which several successive high pressure product isolation zones are used in which different pressures prevail, the pressure in at least one high pressure product isolation zone being greater than 500 bars. In this process, the different solubility, in the reaction gas at various pressures, of polymers having different molecular weights is utilized to effect a separation into various polymer fractions. The pressures are adjusted in accordance with the solubility so as to give the desired fractions, ie. polymers having the desired properties.

This process has two decisive disadvantages:

1. The properties of the polymers obtained from the various isolation zones are not mutually independent. Hence, if the polymerization product obtained from a particular isolation zone is modified, the properties of the polymerization products from the other isolation zones necessarily alter at the same time.
2. The amounts of polymer obtainable from the various product isolation zones are related to the product properties. This means that a particular product cannot be obtained in an amount which is variable independently of the amounts of product from the other product isolation zones.

It is an object of the present invention to eliminate the disadvantages described above, ie. so to modify and operate the isolation system that very different products, in amounts which can be chosen according to requirements, and with mutually independent polymer properties, can be obtained using only one high pressure polymerization system.

We have found that this object is achieved by a process wherein a high pressure polymerization system is followed by several parallel high pressure product isolation zones which are at different temperatures and in which the mean product residence times may be identical or different, and wherein the various low pressure product isolation zones downstream from the high pressure product isolation zones are, in turn, at identical or different temperatures and give identical or different mean product residence times.

Preferably, the temperatures can be different in the various parallel high pressure product isolation zones.

In another preferred embodiment, the mean product residence time is greatest in the high pressure product isolation zone or low pressure product isolation zone which is at the highest temperature.

In a further preferred embodiment, the temperature and/or the mean product residence time is particularly high or low in the low pressure product isolation zone which is downstream from the high pressure product isolation zone in which, for its part, the temperature and/or the mean product residence time is particularly high or low.

In another preferred embodiment, the reaction mixture is fed from one of the high pressure product isolation zones into the low pressure product isolation zone belonging to another high pressure product isolation zone. A further process deserving particular mention is that in which there is a plurality of low pressure product isolation zones downstream from each of the high pressure product isolation zones.

Ethylene polymers are to be understood as ethylene homopolymers and ethylene copolymers which can be manufactured under the stated conditions of temperature and pressure. The term ethylene polymers embraces not only solid, but also waxy and oily, polymers.

Ethylene homopolymers and copolymers are to be understood as those which can be manufactured at pressures of from 500 to 5,000 bars and at from 50° to 450° C. Any of the polymerization initiators and chain transfer agents conventionally used in the homopolymerization or copolymerization of ethylene may be employed for the purposes of the invention. Any of the compounds copolymerizable with ethylene may be used for this same purpose in the process of the invention.

The invention may be carried out with the conventional continuous high pressure polymerization systems, eg. with continuously operated tubular reactors and/or in stirred autoclaves.

To isolate the polymers formed, the reaction mixture leaving the polymerization zone, and consisting of the polymer formed and of unconverted monomers, is let down to a pressure of from 100 to 500 bars and fed into high pressure product isolation zones arranged in parallel, in which most of the polymer formed is isolated. The material not isolated in the high pressure product isolation zones passes into the downstream low pressure product isolation zones, where the pressure is from 1 to 10 bars. In these latter zones, any residual polymer can substantially be isolated from the volatile constituents. The temperatures in the various high pressure and/or low pressure product isolation zones may be from 100° to 400° C. The mean product residence time in the high pressure and/or low pressure product isolation zones is from 0.5 to 60 minutes. The term high pressure product isolation zone is applied to a zone in which the pressure is from 100 to 500 bars and in which the polymers formed are isolated from the volatile phase of unconverted compounds. The high pressure product isolation zone may also be described as a high pressure product isolation apparatus or high pressure separator. In the text which follows, the term high pressure separator will be used in the Examples. The term low pressure product isolation zone is applied to a zone in which the pressure is from 1 to 10 bars. It may also be described as a low pressure product isolation apparatus or low pressure separator. In the text which follows, the latter term will be used in the Examples. Conventional vessels are used as the high pressure and low pressure separators.

In the process according to the invention, provided the temperature range of from 100° to 400° C and the mean product residence time of from 0.5 to 60 minutes are adhered to, the mean product residence times in each individual high pressure product isolation zone and in each individual low pressure product isolation zone may be identical, whilst the temperatures are different. Finally, if the mean residence times of the product in each individual high pressure product isolation zone and in each individual low pressure product isolation zone are different, the temperatures in the various high pressure and low pressure product isolation zones may, according to the invention, be identical or different.

In the preferred embodiment, the temperatures only differ in the various parallel high pressure product isolation zones. In another preferred embodiment, the mean product residence time is high and the temperatures in the high pressure product isolation zones are higher than in the low pressure product isolation zones. In a further suitable embodiment, both high temperatures and high residence times are used in the high pressure and low pressure separators. In yet another preferred embodiment, the mean product residence time is longest in the high pressure product isolation zone which is at the highest temperature.

The term mean product residence time is to be understood as the mean residence time of the polymer formed, in the high pressure and/or low pressure product isolation zone. This residence time is defined by the ratio of the amount of product present in the separator to the amount of product passed through the separator per unit time.

The principle of the process according to the invention will now be explained further with the aid of the appended FIG. I.

The reaction gas (ethylene or a mixture of ethylene and comonomers) is compressed to the reaction pressure in a precompressor 1 and a post-compressor 2 and is fed into the reactor 3, which may be a stirred reactor and/or a tubular reactor. The polymer formed, and the unconverted monomers, pass from there through a valve 4, in which the reaction mixture is let down from the reaction pressure to approximately the pressure at which the product is to be isolated, and through the valves 5 A, 5 B and 5 C, by means of which the amounts of reaction mixture passing to the various separators are adjusted, into the cooling or heating apparatuses 6 A, 6 B and 6 C and from there into the high pressure separators 7 A, 7 B and 7 C. The volatile phase of the reaction mixture, separated off in the high pressure separators, is fed to the intake side of the post-compressor 2 in order to be re-compressed. The solutions in which the polymer content has thus been increased pass to the cooling or heating apparatuses 8 A 1a, 8 A 1b, 8 A 2, 8 B a, 8 B b und 8 C and from there through the throttle valves 9 A 1, 9 A 2, 9 B and 9 C into the low pressure separators 10 A 1, 10 A 2, 10 B and 10 C. The components which are volatile under the conditions in the latter separators are returned to the intake side of the pre-compressor 1. The polymers are run off through the lines 11 A 1, 11 A 2, 11 B and 11 C and are subsequently processed (this stage not being shown in the FIGURE). The object of the cooling or heating apparatuses 6 A, 6 B, 6 C and 8 A 1a, 8 A 1b, 8 A 2, 8 B a, 8 B b and 8 C is to bring the reaction mixture to approximately the temperatures required in the separators. Cooling and heating can be effected by indirect heat exchange, using heat exchangers of various sizes, but also by direct heat exchange, through injection of, eg., monomers, water and the like. The temperatures in the separators may be from 100° to 400° C. The separators may be of different sizes so as to make it possible to isolate different amounts of polymer and select different residence times of the polymer in the separators. As may be seen from the FIGURE, the high pressure separators may be connected to one another so that polymer isolated in different high pressure separators can be mixed. A plurality of low pressure separators, which may be of different sizes, may be placed downstream from one high pressure separator (such low pressure separators being 10 A 1 and 10 A 2 in the FIGURE).

The FIGURE shows three high pressure separators and four low pressure separators. This is one possible embodiment of the process according to the invention, but of course it is possible to use a larger or smaller number of separators.

EXAMPLE 1

A high pressure tubular reactor is equipped with two parallel high pressure separators which are run under the conditions shown in Table 1. Approximately the same amounts of product are taken off the two separators. One of the two high pressure separators is followed by two low pressure separators (II and III).

Table 1 shows the properties of the polyethylene obtained under various conditions in the high pressure separators A and B and low pressure separators I, II and III.

TABLE 1

| | Separator A | | Separator B |
|---|---|---|---|
| High pressure separators | | | |
| Temperature (° C) | 250 | | 290 |
| Pressure (bars) | 270 | | 270 |
| Mean product residence time (mins) | 4 | | 4 |
| Low pressure separators | I | II | III |
| Temperature (° C) | 225 | 260 | 260 |
| Pressure (bars) | 4.5 | 4.5 | 4.5 |
| Mean product residence time (mins) | 15 | 15 | 15 |
| Amount of LDPE$^x$ (kg/hr) | 650 | 325 | 325 |
| Product properties | | | |
| Density (g/cm$^3$)[1] | 0.928 | 0.927 | 0.927 |
| Melt index (g/10 mins)[2] | 0.3 | 0.6 | 0.6 |
| +Scatter (%)[3] | 15 | 10 | 9 |
| +Strength of a film (g)[4] | 170 | 110 | 105 |

(Notes on the preceding Table 1)
$^x$LDPE = high pressure (low density) polyethylene
+measured on a 40 μfilm
[1] according to DIN 53,479
[2] according to DIN 53,735
[3] determined by means of an apparatus described by E. Schuch in Kunststoffe, 56 (1966), 350 – 354
[4] Drop Dart Impact Test according to ASTM D 1709-67

EXAMPLE 2

A high pressure tubular reactor is provided with two high pressure separators, each of which is followed by a low pressure separator. The separators operate under the conditions shown in Table 2. Approximately the same amount of product is taken off each of the two low pressure separators.

Table 2 shows the properties of the polyethylene obtained under the various conditions in the high pressure and low pressure separators.

TABLE 2

|  | Separator A | Separator B |
|---|---|---|
| High pressure separators |  |  |
| Temperature (° C) | 200 | 300 |
| Pressure (bars) | 320 | 320 |
| Mean product residence time (mins) | 3 | 3 |
| Low pressure separators |  |  |
| Temperature (° C) | 180 | 160 |
| Pressure (bars) | 5 | 4 |
| Mean product residence time (mins) | 15 | 15 |
| Amount of LDPE (kg/hr) | 850 | 850 |
| Product properties |  |  |
| Density[1] | 0.918 | 0.916 |
| Melt index (g/10 mins)[2] | 0.2 | 1.5 |
| +Scatter (%)[3] | 72 | 40 |
| +Strength of a film (g)[4] | 110 | 72 |

+measured on a 40 μ film
[1] according to DIN 53,479
[2] according to DIN 53,735
[3] determined by means of an apparatus described by E. Schuch in Kunststoffe, 56 (1966), 350–354
[4] Drop Dart Impact Test according to ASTM D 1709-67

EXAMPLE 3

A tubular reactor is equipped with two parallel high pressure and low pressure separators which operate under the conditions shown in Table 3. Only about 20% of the high pressure polyethylene produced is taken off the separators operating at the lower temperatures and about 80% of the high pressure polyethylene produced is taken off the separators operating at the higher temperatures.

The product properties achieved are shown in Table 3.

TABLE 3

|  | Separator A | Separator B |
|---|---|---|
| High pressure separators |  |  |
| Temperature (° C) | 230 | 300 |
| Pressure (bars) | 270 | 270 |
| Mean product residence time (mins) | 2 | 10 |
| Low pressure separators |  |  |
| Temperature (° C) | 200 | 260 |
| Pressure (bars) | 4 | 3.3 |
| Mean product residence time (mins) | 25 | 10 |
| Amount of LDPE (kg/hr) | about 300 | about 1,300 |
| Product Properties |  |  |
| Density (g/cm³)[1] | 0.922 | 0.920 |
| Melt index (g/10 mins)[2] | 1.4 | 4.5 |
| +Scatter (%)[3] | 15 | 10 |
| +Strength of a film (g)[4] | 120 | 105 |

+measured on a 40 μ film
[1] according to DIN 53,479
[2] according to DIN 53,735
[3] determined by means of an apparatus described by E. Schuch in Kunststoffe, 56 (1966), 350 – 354
[4] Drop Dart Impact Test according to ASTM D 1709-67

EXAMPLE 4

A high pressure tubular reactor is equipped with two parallel high pressure separators. Each high pressure separator is equipped with a low pressure separator. The separators are operated under the conditions shown in Table 4. About 85% of the product formed is taken off the separators operating at the lower temperatures and about 15% off those operating at high temperatures. Each high pressure separator is provided with a low pressure separator. Table 4 shows the product properties achieved under the various conditions in the separators.

TABLE 4

|  | Separator A | Separator B |
|---|---|---|
| High pressure separators |  |  |
| Temperature (° C) | 230 | 390 |
| Pressure (bars) | 300 | 300 |
| Mean product residence time (mins) | 2 | 20 |
| Low pressure separators |  |  |
| Temperature (° C) | 210 | 300 |
| Pressure (bars) | 2.5 | 2.5 |
| Mean product residence time (mins) | 10 | 20 |
| Amount of product (kg/hr) | 1,350 | 350 |
| Product properties |  |  |
| Density (g/cm³)[1] | 0.918 | 0.917 |
| Melt index (g/10 mins)[2] | 20 | — |
| Melt viscosity at 120° C | — | 990 cSt |
| Shore C hardness[3] | 73 |  |
| Ball indentation hardness[4] | 16 |  |

[1] according to DIN 53,479
[2] according to DIN 53,735
[3] according to DIN 53,505
[4] according to DIN 53,456

We claim:

1. A process for the manufacture of an ethylene polymer by homopolymerization of ethylene or copolymerization of ethylene with one or more other compounds which are copolymerizable with ethylene in a continuous polymerization system at a pressure of from 500 to 5,000 bars and a temperature of from 50° to 450° C, followed by isolation of the resulting polymer from the reaction mixture obtained, at from 100° to 400° C, with a mean residence time of from 0.5 to 60 minutes, in a plurality of high-pressure product isolation zones at a pressure of from 100 to 500 bars and a plurality of subsequent low-pressure product isolation zones at a pressure of from 1 to 10 bars, wherein the various high-pressure product isolation zones which are arranged in parallel are each at a different temperature, and the various low-pressure product isolation zones are each at different temperatures, the mean product residence times in the various high-pressure and low-pressure product isolation zones being identical or different.

2. A process as set forth in claim 1, wherein the mean product residence time of the reaction product in the high pressure and low pressure product isolation zones is greatest in the zone which is at the highest temperature.

3. A process as set forth in claim 1, wherein the reaction mixture from one of the high pressure product isolation zones is fed into the low pressure product isolation zone belonging to another high pressure product isolation zone.

4. A process as set forth in claim 1, wherein there is a plurality of low pressure product isolation zones downstream from each of the high pressure product isolation zones.

* * * * *